United States Patent [19]
Benson

[11] 3,740,446
[45] June 19, 1973

[54] PERCEPTION APPARATUS FOR THE BLIND

[76] Inventor: Bengt Anders Benson, Styckjunkargatan 5, Stockholm, Sweden

[22] Filed: Dec. 27, 1971

[21] Appl. No.: 212,090

[52] U.S. Cl. ............................................. 35/35 A
[51] Int. Cl. ....................... G09b 21/00, G06k 9/00
[58] Field of Search ..................................... 35/35 A

[56] References Cited
UNITED STATES PATENTS

| | | | |
|---|---|---|---|
| 3,250,023 | 5/1966 | Benson | 35/35 A |
| 2,420,716 | 5/1947 | Morton et al. | 35/35 A |
| 3,229,387 | 1/1966 | Linvill | 35/35 A |
| 1,921,000 | 8/1933 | Naumburg | 35/35 A |
| 2,432,123 | 12/1947 | Potter | 35/35 A |

*Primary Examiner*—Wm. H. Grieb
*Attorney*—Woodhams, Blanchard and Flynn

[57] ABSTRACT

A perception apparatus to aid the blind is provided in the form of a scanning disc of the Nipkow type having a spiral pattern of apertures adapted to scan in sequence an optically formed image, the scanning pulses controlling a high-frequency pulse generating system with low power, high tension output in the form of pulses of Tesla character capable of creating tactile stimulation of the human skin, which pulses are supplied to contact pegs insulatedly embedded in, and flush with the surface of, the scanning disc or a member associated therewith, said pegs being oriented in a spiral pattern corresponding to that of the scanning apertures. The tactile pulses are delivered to a picture gate onto which the blind user places a finger tip to receive through said gate a tactile display of the scanned image. The arrangement of the generator system and the control system is such that the low power, high tension tactile pulses are only transmitted when the scanning apertures detect a change of illumination, from light to darkness or vice versa, or both.

8 Claims, 15 Drawing Figures

3,740,446

PERCEPTION APPARATUS FOR THE BLIND

BACKGROUND OF THE INVENTION

The present invention relates to an apparatus to aid the blind by providing direct access to printed documents by transforming optical images from a printed page into tactile displays which can be percepted and interpreted by the blind user.

In recent time, an optical-tactile reading aid of the type envisaged, called the "Optacon", has been developed and used in practice with certain success. In brief the Optacon reading aid utilizes a hand-held probe which images a vertical section of a letter space onto a 24 × 6 array of photosensors. The probe is manually moved across the line of print and the signal arriving from respective photosensors controls a tactile stimulator in a corresponding array of 144 stimulators, which are placed on a single finger. The stimulators are in the form of small vibrating rods or pins, driven by piezo-electric reeds. The reader senses the tactile image with the fingertip of one hand while moving the small optical pickup probe with the photosensors across the line of print with the other. Further details of the Optacon reading aid can be had from, for example, J.G. Linvill and J.C. Bliss, "A direct translation reading aid for the blind", Proc. IEEE, vol. 54, pp. 40–51, Jan., 1966, and J.C. Bliss, "A relatively high-resolution reading aid for the blind", IEEE Trans. Man-Machine Systems, vol. MMS-10, pp 1–9, Mar., 1969. A general survey of perception aids for the blind is given in "Sensory aids for the blind: a challenging problem with lessons for the future", by P.W. Nye and J.C. Bliss, in Proc. IEEE, vol. 58, No. 12, Dec., 1970, pp. 1878–98.

Although the Optacon has proved useful, it is nevertheless an extremely complicated and costly device; moreover, it has a total weight of about 8 lbs.

In the U.S. Pat. No. 3,250,023 a perception apparatus of the optical-tactile type is proposed, wherein the "tactile" section is of particular interest since no mechanical means are used for producing the necessary tactile displays. Also in this case the user's fingertips are used as sensing organs, although in this case a pure contact sensation of the shape of the character on the user's finger tip is produced by electrical means of a special kind, viz., the high-tension, high-frequency, low energy so called Tesla currents. As is well known in the art these currents, owing to their extremely high frequency, are not capable of passing through the body tissues, but follow the epidermic layer of the skin. Moreover, as they possess almost negligible energy, practically no heat is developed and "burning" of the skin does not occur. In fact, they produce a pure sensation of touch when allowed to discharge from an electrode against the skin.

The object of the present invention is to produce an optical-tactile reading or perception aid for the blind which utilizes the basic principles given in the said U.S. patent but which also includes novel features of significant practical importance. A primary object of the invention is to provide a light apparatus of reasonable complexity and cost, preferably self-contained and of moderate size, which can be held and operated by one hand, similar to an electric razor.

BRIEF DESCRIPTION OF THE DRAWINGS

An embodiment of the invention will now be described with reference to the attached drawings, wherein.

DESCRIPTION OF THE PREFERRED EMBODIMENTS

Figure 3:
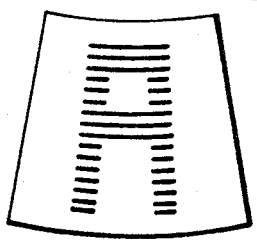
FIG. 3 indicates how the letter A appearing in the picture gate of the apparatus of the U.S. Pat. No. 3,250,023 referred to above is displayed.

By way of introduction, and in order to facilitate a complete understanding of the invention, a brief description will be given of the apparatus described in the above mentioned U.S. Pat. No. 3,250,023 with reference to FIGS. 1–3 which show the apparatus of this patent modified in accordance with the present invention. Thus, the apparatus diagrammatically shown in FIGS. 1 and 2 comprises a scanning disc 10 or so called Nipkow disc mounted on a rotatable shaft and made of transparent, insulating material, such as polyacrylate (lucite). The disc 10 is covered by a hood 12 and has located around the periphery of the underside thereof a recess which receives a ring 14, the ring also being of an insulating material although in this instance the material is opaque. Scanning holes 16 characteristic of the Nipkow disc, are arranged in spiral pattern around the disc, see FIG. 1. As indicated schematically in FIG. 2, an optical device 18 is arranged to project a magnified image of an illuminated text or lineation, located on a substrate 20, onto the underside of the ring 14 located in the recess in the disc 10. A photocell or photo transistor 22 is mounted on the opposite of the disc in a chamber formed by the hood 12. Because the disc 10 is transparent, the light sensitive member 22 is able to detect the light signals arriving from the scanning holes 16 as they pass the image field during rotation of the disc. This is well known in this art.

Figure 1:
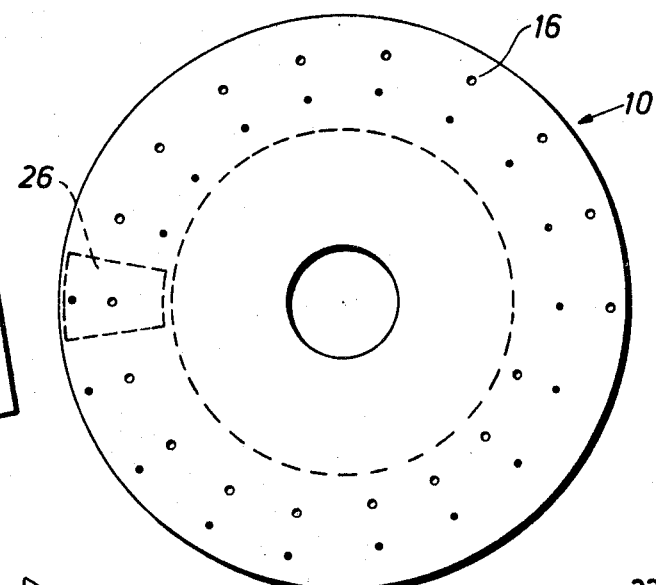
FIG. 1 is a horizontal projection of a perforated scanning disc forming part of the apparatus in accordance with the invention.

Inserted in the disc 10 and the ring 14 is a series of pins or pegs 24 arranged in the same spiral configuration as the holes 16 but angularly displaced through 180° relative to the series of holes (FIG. 1). Each peg will thus form a conductive connection between the top side of the disc 10 and the underside of the ring 14.

Further, a window or gate 26 is provided in the hood 12 diametrically opposite the photocell optics 18, 22. The gate is made of an insulating material and may be considered a kind of stencil or screen penetrated or "perforated" by a plurality of parallel channels having a width of 0.3 − 0.4 mm. The gate corresponds in size to the opposite image field scanned by the perforate spiral 16. Located immediately beneath the gate 26, on the opposite side of the disc 10 and the ring 14, is an electrode 28.

OPERATION

Figure 2:
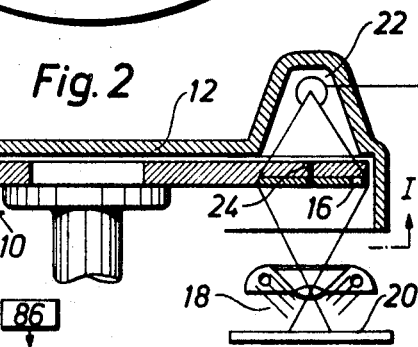
FIG. 2 is a diagrammatically transverse section through the said disc mounted in a housing to illustrate the manner in which the various parts of the apparatus co-operate with one another.

The apparatus operates in the following way. Upon rotation of the disc 10, the holes 16 scan the image of the illuminated lineation on the substrate 20 and the image is projected on to the underside of the ring 14. Thus, when passing the image field, the holes 16 will let through and shield off light alternatingly in accordance with the distribution of light and darkness on the scanned image, and the impulses received during this course by the photocell or photo transistor 22 are passed on to a generator assembly for generating tactile sense pulses, this assembly being represented in FIG. 2 by a small block diagram having the same designations as the diagram illustrated in FIG. 13 of a proposed assembly hereinafter disclosed. In principle, the assembly is designed and arranged in a manner such that when it receives from the photocell or photo transistor 22 an impuls corresponding to light falling on the transistor the assembly is blocked, but when the photo transistor is dark the assembly emits a high tension, high frequency pulse of Tesla character to the electrode 28. As shown in FIG. 2, the user holds his finger on the gate 26 and the high-voltage Tesla pulse passes from the electrode 28, through the peg 24, which at this time is below the gate, and further through the opposite channel in the gate and strikes against the tip of the finger of the user. It will be readily seen from the arrangement of the hole and peg spirals in FIG. 1, that each image analyzed by the light scanning system will be reproduced in the gate 26 by the metal pegs as a tactile image composed of Tesla pulses. As pointed out in the aforementioned patent, the Tesla currents, in addition to their high tension, are also characterized by their extremely high frequency, which makes it impossible for them to penetrate the skin in any way, and the skin is only affected superficially. In addition, the Tesla currents are extremely poor in energy and will therefore not have any permanent effect on the skin; they will, in fact, only give a slight sensation of touch. In FIG. 3 it is shown how the letter A is drawn by the pegs 24 passing below and across the gate 26, the pegs thus emitting a flow of Tesla pulses when the corresponding holes 16 pass the dark portions of the image of the letter projected on the underside of the ring 14 by the optics 18.

Figure 7:
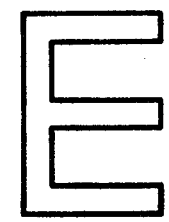
Figure 14:
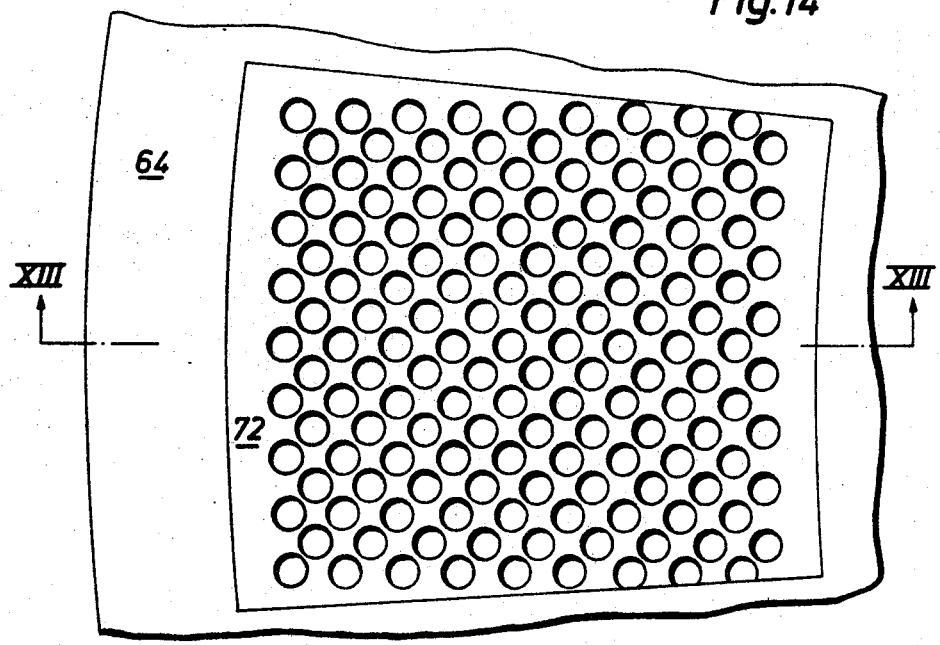
FIG. 14 is a plan view of the picture gate shown in FIG. 13.

In accordance with the above, each contact peg 24 will emit its respective pulses uninterruptedly as long as the corresponding scanning hole 16 passes a dark area of the scanned image field. However, this "extended" tactile action tends to give a blurred or indistinct impression to the receiver, i.e., the user of the apparatus, and according to the invention it is proposed instead that the above mentioned generator assembly be modified to react in another way. More particularly, this modification employs the expedient whereby only one single high frequency Tesla pulse at a time is let through to the relevant contact peg 24 of the tactile section, and that this takes place only when there is a change in light in the optic section, either when there is a change from light to dark or vice versa, i.e., from dark to light, or when both these changes occur. This is brought about by means of well known flip-flop circuits and the result is illustrated in FIGS. 14–7.

Figure 4:
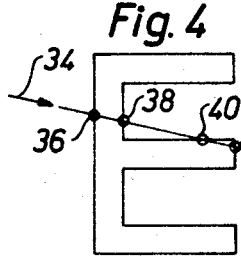
FIG. 4 illustrates schematically scanning of the letter E by means of the apparatus of the invention.
Figure 5:
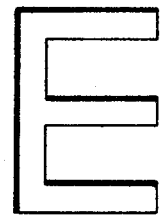
FIGS. 5–7 illustrate how the aforementioned letter E is reproduced according to various alternatives in the picture gate of the apparatus.
Figure 6:
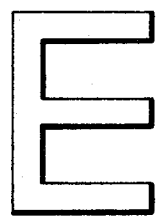

Thus, in FIG. 4 the image of the letter E is shown on a large scale, and it is assumed that a hole 16 in the scanning disc passes across the image along the line 32 (for the sake of simplicity shown straight, but in reality the line is of course part of a circle) in the direction of the arrow 34, this direction forming an angle $\alpha$ with the direction of the line of print, of which the illustrated capital E is a component. The angle $\alpha$ is of course determined by how the apparatus is held in relation to the scanned text; the angle $\alpha$ is exaggerated in the Figure but, as will be seen from the following, it should not equal zero, since otherwise images of good contrast and resolution will not be created. The scanning path 32 intersects the image outlines at four points 36, 38, 40 and 42 where a change in light takes place. At the points 36 and 40, the change is from light to dark, while a change from dark to light takes place at points 38 and 42. Now, if the receiving section of the apparatus is adapted to react only to a light-dark change and then to emit one single Tesla pulse, the "tactile image" received will obviously appear as shown in FIG. 5, that is, four straight sharp edges which are easy to feel by the tactile sense and which can be readily identified as forming part of an E. In a corresponding manner, the image according to FIG. 6 is obtained if the aforementioned reaction only takes place when changing from dark to light. Of course, the apparatus may also be adapted to react to both types of changes, in which case the outlines of the whole picture is drawn, see FIG. 7. If the scanning disc rotates in the opposite direction, i.e., scanning along line 32 taking place in a direction opposite that of arrow 34, the sequence of events experienced with a change in light will be reversed.

Figure 8:
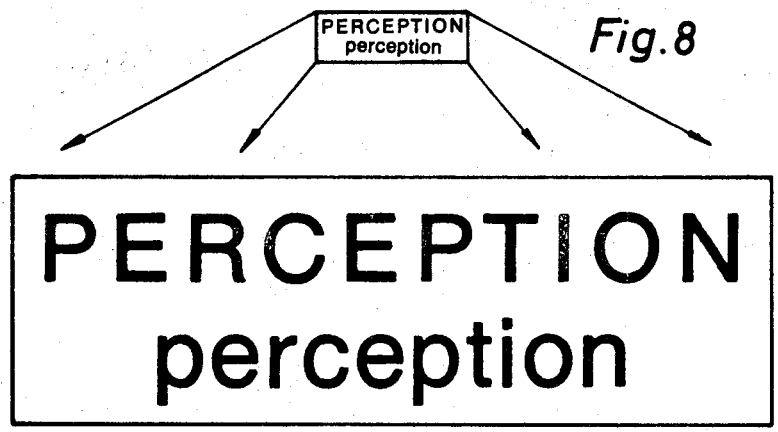
FIGS. 8–12 illustrate how the words "PERCEPTION" and "perception" will be reproduced by the apparatus according to various alternatives thereof.
Figure 9:
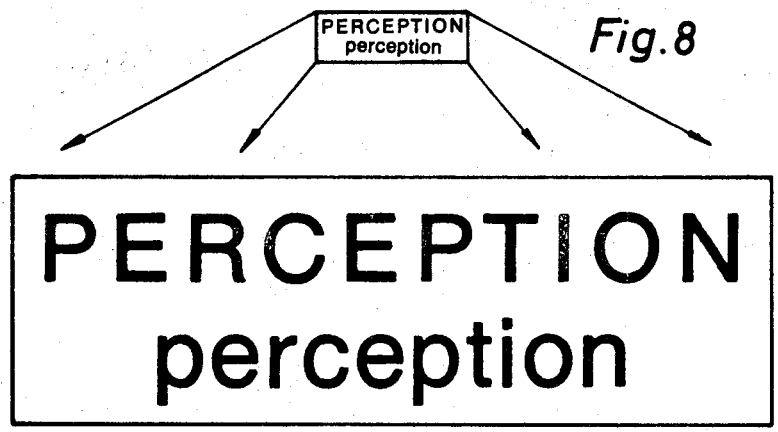
Figure 10:
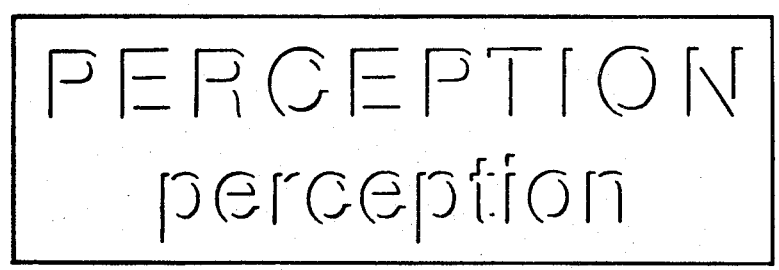
Figure 11:
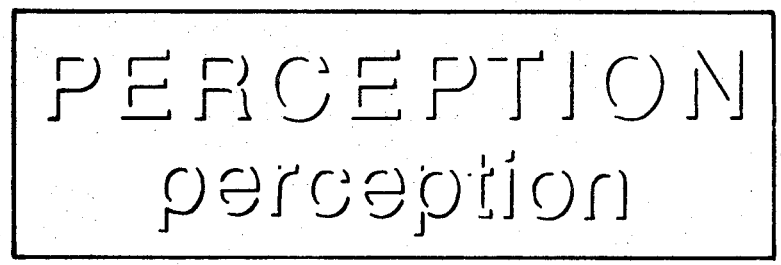
Figure 12:
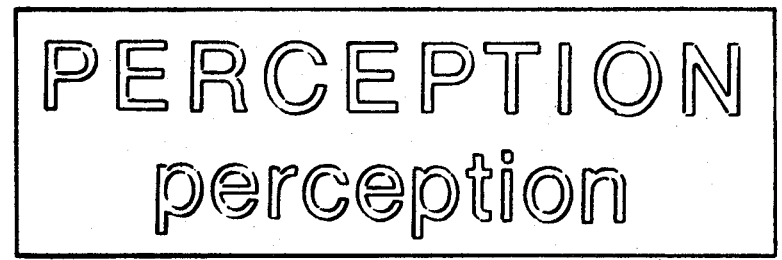

FIGS. 8–12 illustrate how a text image will appear when scanned and reproduced according to the above. A frame of text, see FIG. 8, showing the word "perception" printed with small and capital letters is scanned, the magnification being five times. If the pulse-emitting section of the apparatus is operating in such a way that it emits pulses continuously at dark passages, an image substantially as that shown in FIG. 9 will be drawn. The text images reproduced in FIGS. 10–12 are obtained in flip-flop operations effected with the various alternatives discussed above, these images corresponding to the images shown in FIGS. 5–7, respectively. It should at this point be clearly understood why scanning is preferably carried out at an angle $\alpha$ with the line of text: hereby horizontal border lines will be properly intersected and the resolution of the images will be greatly improved. Such differences as those occurring between e.g., letters e and c will be adequately detected, cf. in particular FIGS. 10 and 11.

The question as to how the high frequency, high tension and short duration energy pulses or Tesla pulses generated and emitted by the apparatus are best and most clearly sensed by the user will now be discussed with reference to FIGS. 13 and 14. The optimal conditions aimed at are, of course, such that a pulse having the lowest possible energy content will cause the strongest possible tactile effect. The pure sensation of touch which is given by an ordinary Tesla discharge is probably created by a mechanical effect on the epidermis layer of the skin by the microscopic "bang" with the accompanying momentary gas expansion and pressure raise which occurs close to the surface of the skin and which is caused by the small arc or spark which is formed.

Figure 13:
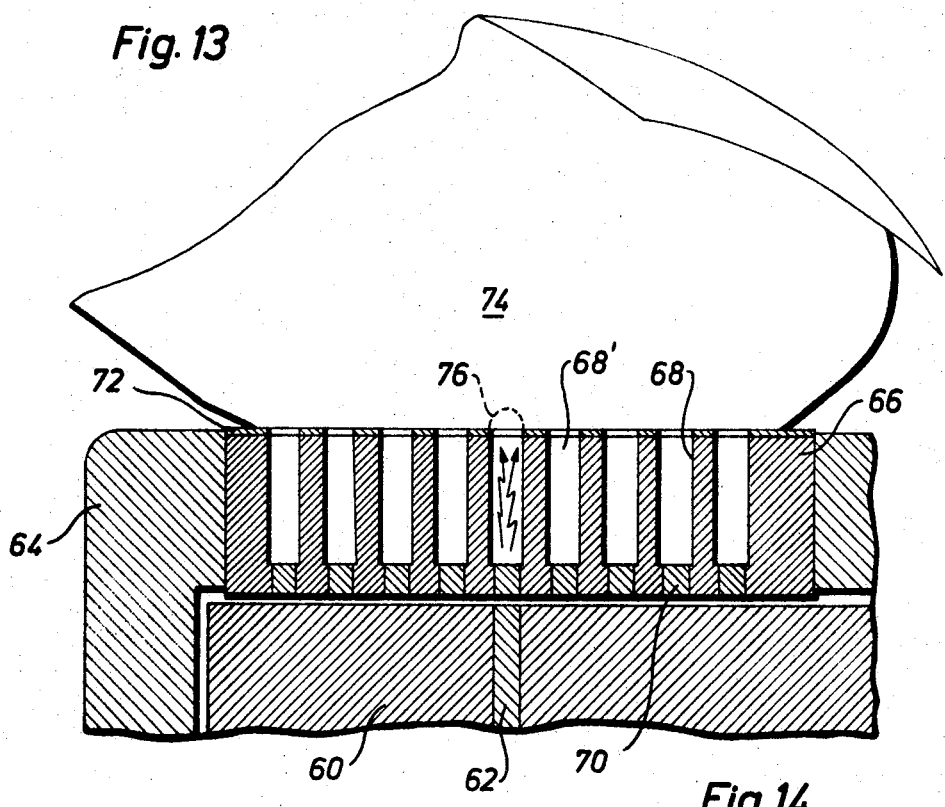
FIG. 13 is a diagrammatic transverse section on a greatly enlarged scale through a picture gate forming part of the apparatus, the section being taken along line XIII—XIII in FIG. 14.

FIGS. 13 and 14 illustrate how the mechanical action of the Tesla discharge may be amplified and be caused to imitate the action of, for instance, a vibrating pin. In FIG. 13, the reference 60 designates a rotating disc of a perception apparatus constructed substantially in accordance with the above. The disc combines scanning of the image and emitting of tactile pulses, and thus corresponds to the disc 10 of FIGS. 1 and 2. The reference 62 designates one of the contact or emitter metal pegs recessed in the disc in spiral configuration and corresponding to pegs 24. As with the disc 10 the disc 60 is adapted to rotate within or below a hood 64 wherein a "picture gate" 66 is provided in analogy with the gate 26 shown in FIG. 1. The gate 66 consists of a plate of insulating material embodying rows of parallel, closely spaced through-passing holes or channels 68. The channels have a diameter of the order of 0.3– 0.6 mm. and are closed at their inner ends or bottoms by short metal pins or plugs 70. The upper section of each channel 68 thus form an air-filled capillary 68'. The top side of the gate 66 may be covered with a thin grounded metal layer 72 exhibiting the same pattern of holes as the gate 66.

If it is now assumed that a Tesla pulse is emitted in the position shown in FIGS. 13 and 14, the emitter peg 62 will thus receive a high tension pulse of very short duration and a flash-like discharge will take place through the nearest metal plug 70 and capillary channel 68' and against the user's finger tip 74 or against the grounded metal layer 72 at the orifice of the channel, if such a layer is provided. In any event, a momentary rise in pressure and gas expansion will take place in channel 68', and in the orifice thereof a strong but short "puff" of expanding gas will be felt, this puff being indicated by dash lines at 76 and creating a distinct tactile impression at the intended spot within the picture gate 66, in accordance with the method disclosed above of creating a sharp-edged tactile image.

The above must be considered as a fairly summary exposition of a fundamental nature leaving several possibilities open to alternative or modified designs. Only two possibilities of particular interest will be indicated here. First, attention is drawn to the possibility of insulating electrically the system 66–72 creating tactile blows from the user's finger by means of elastic members, or solid but movable members, interposed between the finger and the said system. Secondly, it should also be pointed out that if it should not prove appropriate to make the apparatus as a single hand-held unit, its main portion could be provided in a small stationary box, from which the user receives the tactile pulses by one hand, while he scans the text or lineation by means of a small optic probe by the other hand, the probe being connected to the main apparatus by means of a flexible fiber-optic light guide of a type well known in the optical art. However, a discussion of these and other possibilities would carry too far, for which reason the present disclosure has been limited to the fundamental principles of creating mechanical sensations of touch by electrical means.

DESCRIPTION OF THE PREFERRED ELECTRONIC CIRCUITRY

Figure 15:
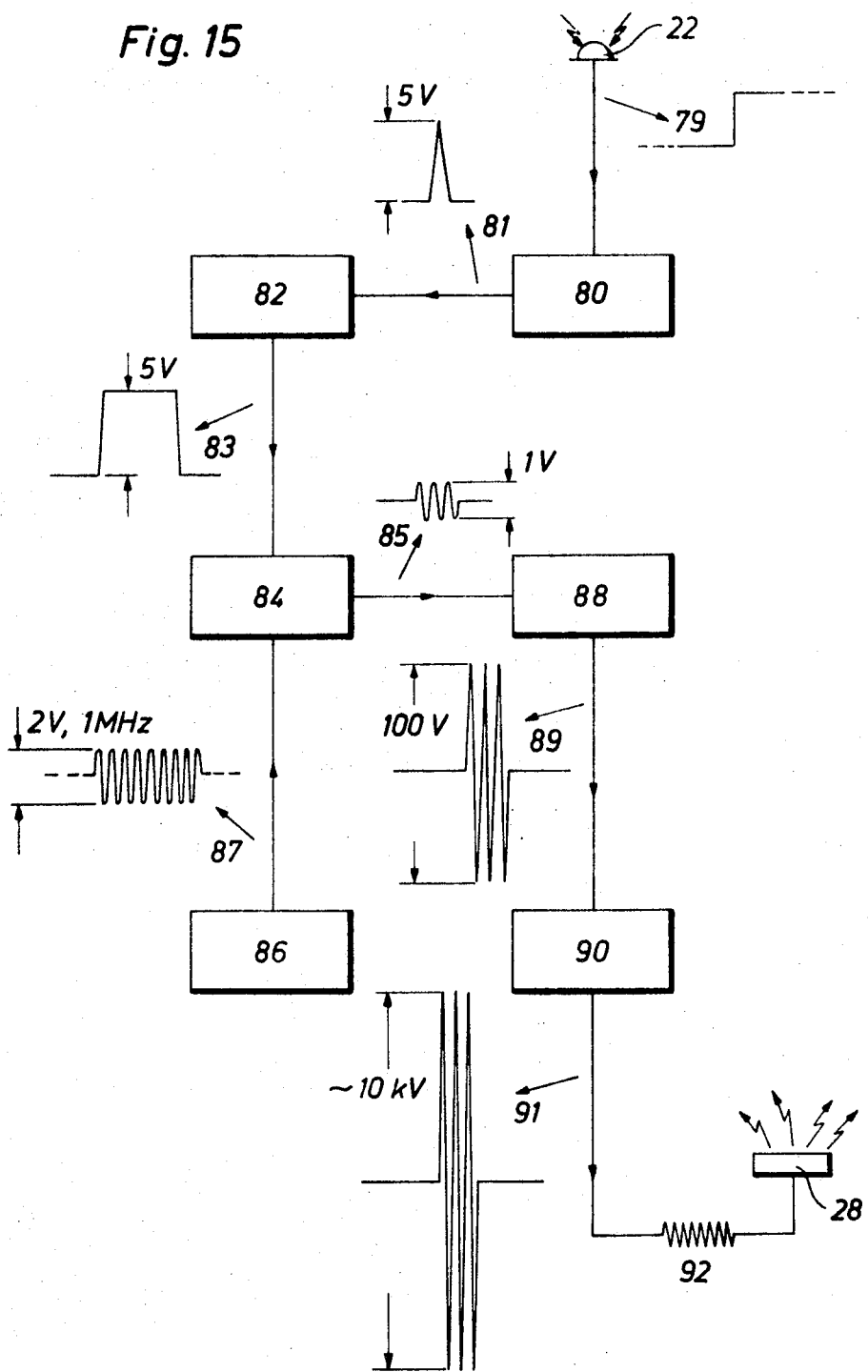
FIG. 15 is a block diagram of proposed electronic circuitry for use with the apparatus of the invention.

With reference to the block diagram of FIG. 15 a proposed design of the electronic equipment or circuitry of the perception apparatus of invention will be described. In accordance with the foregoing this equipment includes a receiving section and a transmitting section, wherein the input of the receiving section, see FIG. 2, is represented by the phototransistor 22 and the output of the transmitting section is represented by the electrode 28. The electronic system comprises six main components and would be best described by a review made step by step from input to output. Thus, in operation the photo transistor 22 is exposed to a series of intensity shifts, that is during scanning the illumination of the transistor changes from full light to darkness as the scanned images are black and white and lack half tones. In FIG. 15 there is shown adjacent the connections between the various components a diagrammatic curve loop illustrating the form of the pulses passed along the connections. Thus between the photo transistor 22 and the next following component a curve step 79 is shown which illustrates an intensity shift in the power given by the photo transistor when a change light-darkness or darkness-light takes place. The said next following component, which thus receives the impulses from the photo transistor 22, comprises an amplifier and pulse former (differentiating circuit) 80 which emits a differentive pulse 81 derived from said intensity shift and having a tension of e.g., 5 V, see the curve sketch. The pulse 81 is received by a monostable multivibrator 82 which emits a gate pulse 83 of a certain duration, say 0.1 milliseconds. This gate pulse is supplied to a balanced modulator 84, which is a valve device for the output from a high frequency oscillator 86 producing a high frequency (about 1 MHz) current 87 of low tension, about 2 V. Thus a high frequency pulse 85 leaves the modulator 84, which lets the pulse through during the duration of the gate pulse, that is, the high frequency pulse 85 will likewise have a duration of 0.1 milliseconds. This pulse is amplified in a high frequency amplifier 88 emitting an amplified high frequency pulse 89 which is then transformed to high tension, about 10,000 V, in a high frequency transformer 90. This transmits by way of a protection resistor 92 the stepped-up high frequency pulse 91 to the electrode 28. In the manner described above, this high frequency pulse continues through the contact peg 62 (when considering the embodiment according to FIGS. 13 and 14) which at the moment of the change in light intensity is located within the picture gate 66. As disclosed above, there is created by the discharged a "kick", of greater or lesser strength according to the setting of the system, against the finger above the gate 66 at a point representing a point on the outline of the scanned image and according to any of the alternatives of FIGS. 10–12. The energy pulse is extremely short but is repeated at a frequency corresponding to the RPM of the disc 64.

What I claim is:

1. In a perception apparatus for the blind including: rotatable scanning disc having a series of apertures arranged in a spiral and adapted to scan an image which is optically formed of indicia, a high-frequency pulse generating system with low power, high tension output in the form of pulses capable of creating tactile stimulation of the human skin, said system including a controlling and amplifying unit, photosensitive means for receiving the light pulses from the scanning disc during the scanning operation and transmitting in response to said pulses signals to said controlling and amplifying unit, which in turn controls in response to the said signals said generator system, a rotatable member of insulating material fixed with respect to said scanning disc for rotation therewith and having a series of contact pegs embedded therein, said pegs having their points flush with the surface of the member, the output of said generator system being conducted to said pegs which are so oriented in the member as to form a pattern corresponding to and moving in synchronism with the spiral of apertures in the scanning disc, the improvement comprising:

means in said controlling and amplifying unit responsive solely to a change in the level of illumination of said photosensitive means for determining the initiation and duration of a one of said low power, high tension pulses;

whereby resolution of the tactile display is improved by reproducing only edges of said indicia.

2. Perception apparatus in accordance with claim 1, wherein a sensing area is provided in the form of a stationary picture gate or window onto which the user of the apparatus places his fingertip to receive the tactily stimulating pulses, said gate having the form of a screen or stencil member of insulating material with a plurality of parallel channels therethrough, said gate being located closely above said insulating member with the embedded pegs and in such a position in relation thereto that the pegs may emit their high tension, high frequency pulses to the underside of the gate to be transmitted through said channels to the user's fingertip.

3. Perception apparatus in accordance with claim 2 wherein the lower ends of said gate channels are closed by plug members of conductive material.

4. Perception apparatus in accordance with claim 1 wherein said change in level of illumination is a change from light to dark.

5. Perception apparatus in accordance with claim 1 wherein said change in level of illumination is a change from dark to light.

6. Perception apparatus in accordance with claim 1 wherein said change in level of illumination includes both changes from light to dark and from dark to light.

7. Perception apparatus in accordance with claim 1 in which said means responsive solely to a change includes differentiating means responsive to said signals from said photosensitive means for producing a differentiative pulse corresponding to an intensity shift in the light striking said photosensitive means, and gate pulse forming means responsive to said differentiative pulses for forming corresponding fixed duration gate pulses, said high frequency pulse generating system further including a high frequency oscillator, modulator means responsive to said oscillator and said gate pulse forming means for producing a high frequency signal of duration corresponding to said gate pulse and means for voltage amplifying successive ones of said high frequency signals to produce said low power, high tension pulses.

8. Perception apparatus according to claim 7 in which the fixed duration of said gate pulse and high tension pulse is about 0.1 millisecond and the latter corresponds to a point on the outline of an indicium scanned by said disk.

* * * * *